US010366525B2

(12) United States Patent
Pao et al.

(10) Patent No.: US 10,366,525 B2
(45) Date of Patent: Jul. 30, 2019

(54) GENERATING AN INTERACTIVE DIGITAL MEDIA ITEM THAT FOLLOWS A VIEWER

(71) Applicant: Adobe Inc., San Jose, CA (US)

(72) Inventors: I-Ming Pao, Palo Alto, CA (US); Yuyan Song, Milpitas, CA (US); Sarah Kong, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 34 days.

(21) Appl. No.: 15/712,693

(22) Filed: Sep. 22, 2017

(65) Prior Publication Data

US 2019/0096112 A1 Mar. 28, 2019

(51) Int. Cl.
| | |
|---|---|
| *G06T 13/40* | (2011.01) |
| *G06T 19/00* | (2011.01) |
| *G06T 17/00* | (2006.01) |
| *H04N 5/232* | (2006.01) |

(52) U.S. Cl.
CPC ............ *G06T 13/40* (2013.01); *G06T 17/00* (2013.01); *G06T 19/00* (2013.01); *H04N 5/23219* (2013.01)

(58) Field of Classification Search
CPC .............. G06F 3/012; G06F 3/013; H04N 13/366–13/383; H04N 13/30–13/398; H04N 2013/40–2013/405; H04N 5/23218; H04N 5/23219; G02B 27/0093; G06T 13/00–13/80; G06T 15/00–15/87; G06T 17/00–17/30; G06T 19/00; G06T 19/006; G06T 19/20; G06T 7/20–7/285
See application file for complete search history.

(56) References Cited

U.S. PATENT DOCUMENTS

| | | | |
|---|---|---|---|
| 8,600,106 B1 | 12/2013 | Parenteau et al. | |
| 8,873,846 B2 | 10/2014 | Jin | |
| 9,679,192 B2 | 6/2017 | Luo et al. | |
| 2015/0253845 A1* | 9/2015 | Kempinski | G06F 3/013 345/156 |
| 2016/0240009 A1* | 8/2016 | Lyren | H04R 1/00 |
| 2016/0314619 A1* | 10/2016 | Luo | G06K 9/00221 |

* cited by examiner

*Primary Examiner* — Paul M Berardesca
(74) *Attorney, Agent, or Firm* — Keller Jolley Preece

(57) ABSTRACT

The present disclosure is directed toward systems and methods for generating an interactive digital media item based on a two-dimensional "selfie." For example, one or more embodiments described herein identifies a face in the two-dimensional "selfie," then builds and displays a three-dimensional model based on the identified face. One or more embodiments described herein also track movement of a viewer of a computing device displaying the three-dimensional model such that one or more portions of the three-dimensional model appear to follow the person viewing the "selfie."

20 Claims, 11 Drawing Sheets

GENERATING AN INTERACTIVE DIGITAL MEDIA ITEM THAT FOLLOWS A VIEWER

BACKGROUND

Electronic communication (messaging, chat, social media, etc.) is an increasingly popular method for users to engage with each other and to document memories. Electronic communications including photos have become a preferred means of communication because digital photographs generally take less time to create than a written message. Similarly, visual messages are capable of effectively communicating more than a typical written message. A "selfie" is an incredibly popular type of digital self-portrait that generally includes a headshot of the picture taker. Users commonly take and share selfies via social media; often several times a day. Social media co-users then view the shared selfies and typically engage in a minimum level of social media activity related to the selfie. For example, a social media co-user may "like" the selfie, or comment on the selfie (e.g., "Looking good!").

As communicating with digital photographs has gained popularity, so too have image effects. Image effects are special digital effects applied to digital photographs that make digital photograph more interesting, fun, and/or engaging. For example, image effects include filters and masks as well as changing displayed colors, adding text, altering the appearance of people or articles, adding additional graphics or animations, and so forth. Conventional image effects and techniques, however, typically are static and lack functionality. Furthermore, conventional systems can create a noticeable lag or latency in the presentation of image effects.

BRIEF SUMMARY

One or more embodiments described herein provide benefits and solve the foregoing and other problems in the art with systems, computer-readable media, and methods that generate interactive digital photographs with increased functionality. For example, the systems, computer-readable media, and methods described herein generate an interactive selfie based on a two-dimensional digital photograph. In one or more embodiments, the interactive selfie includes one or more portions that move in correlation with the movement of a viewer. For instance, in one or more embodiments, the systems, computer-readable media, and methods generate a 3-dimensional model of a head 2-dimensional image of the head. The systems, computer-readable media, and methods then tracks a viewer of the image using a camera of a viewing device. The systems, computer-readable media, and methods then updates one or more features of the 3-dimensional model of the head in response to movement, or lack thereof, of the viewer relative to the viewing device. Thus, one or more embodiments provide an interactive digital media item that automatically reacts to a viewer of the interactive digital media item.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1B:
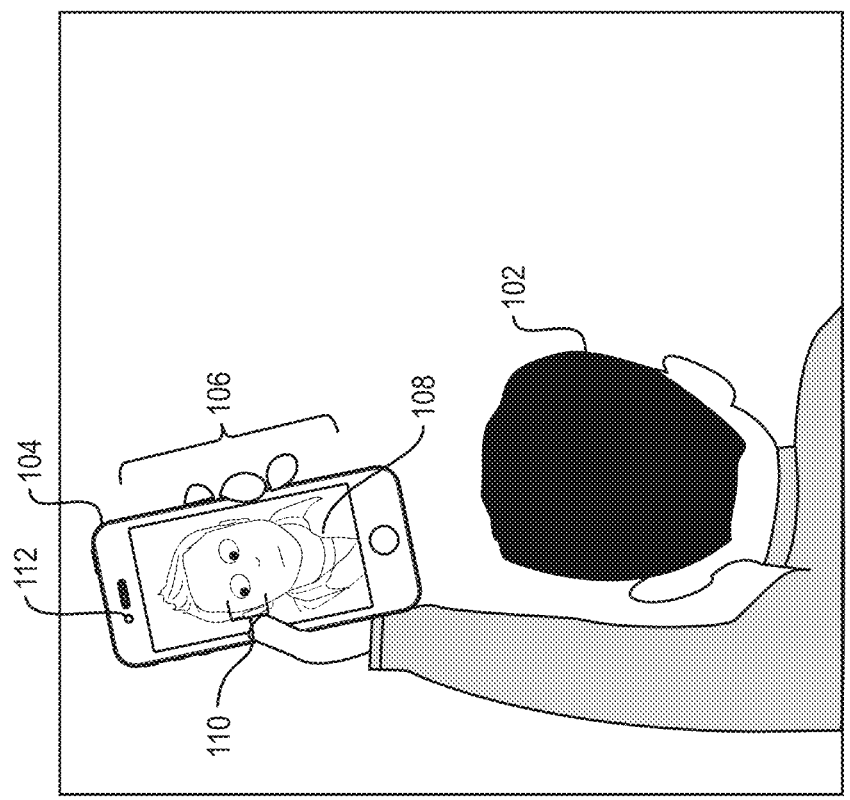
FIGS. 1A-1D illustrate a demonstration of a viewer utilizing a computing device to view an interactive digital media item in accordance with one or more embodiments.

One or more embodiments described herein include a digital media management system that generates an interactive digital media item (e.g., an interactive selfie) that automatically reacts to a viewer of the interactive digital media item. In one or more embodiments, the digital media management system generates an interactive selfie by identifying a face in the two-dimensional digital photograph and creating a three-dimensional model of the identified face. Following this, the digital media management system provides the three-dimensional model as the interactive digital media item via a display on a viewer's computing device.

In order to make the three-dimensional model interactive from a viewer's standpoint, the digital media management system moves one or more portions of the three-dimensional model based on detected movement, or lack thereof, of the viewer. For example, in one embodiment, the digital media management system tracks movement of a viewer relative to the interactive digital media item (i.e., the viewer's computing device displaying the interactive digital media item) by utilizing an image stream from a camera of the viewer's computing device. For instance, the digital media management system identifies an object in the image stream (e.g., the viewer's face may be the object) and determines that the computing device has moved by identifying changes in how the object is shown in the image stream. In additional embodiments, the digital media management system can detect movement of the viewer's computing device by utilizing accelerometer and/or gyroscopic data associated with the computing device.

In response to detecting relative movement of the computing device and the viewer in the image stream from a camera of the viewer's computing device, the digital media management system moves one or more portions of the three-dimensional model. For example, the digital media management system moves the one or more portions such that they are oriented toward the viewer identified from the image frame stream. For instance, the digital media management system can update an eye portion of a three-dimensional model of a face. Then when the viewer moves, or moves the computing device, the digital media management system moves or updates a position of the one or more portions of the three-dimensional model such that those portions remain oriented toward the viewer. To illustrate, in one embodiment, the digital media management system moves the eyes of a three-dimensional model of a face such that the eyes remain oriented toward (e.g., looking at) the viewer, even when the viewer moves his or her computing device in various directions.

Accordingly, the digital media management system provides interactive functionality not previously available to digital photograph viewers. For example, rather than limiting viewers to traditional static selfies, the digital media management system provides selfies that automatically move in response to the movement of a viewer. As such, the digital media management system provides a computer-based solution to an existing problem that plagued traditional digital media viewing systems. Namely, traditional digital media viewing systems provide only static selfies and other digital media items, and provide no additional interactivity for viewers.

As used herein, an image portrait refers to a digital media item including a head whether of a human, animal, cartoon character, an anthropomorphized object, or otherwise. As used herein a "selfie" refers to a digital media item including an image self-portrait. For example, a user generally captures a selfie by focusing a front-facing camera of a client computing device (e.g., a smart phone, a smart wearable, a laptop) at himself or herself. Accordingly, selfies are generally head shots, where the head, face, and upper torso of the subject are captured in the image self-portrait.

In one or more embodiments, a selfie is a two-dimensional digital photograph. As used herein, a "two-dimensional digital photograph" refers to a standard digital photograph. For example, a selfie is generally a two-dimensional digital photograph. As used herein a digital media item refers to a digital media capable of being displayed via a client computing device. Non-limiting examples of digital media items include digital images, videos, three-dimensional models, etc.

As used herein, a "three-dimensional model" refers to a generated model of the surfaces of a three-dimensional object such as a head, face, or upper torso identified within a two-dimensional digital photograph. In one or more embodiments, a three-dimensional model comprises a polygon mesh making up the surfaces of the three-dimensional object with one or more textures applied thereto. In at least one embodiment, a three-dimensional model is made of one or more portions that are capable of being independently manipulated. For example, a three-dimensional model of a human head can include eye portions that can move independent of the face or head. Furthermore, three-dimensional models can be displayed as a two-dimensional image. Additionally, a three-dimensional model can be photorealistic.

As used herein, an "image stream" refers to a stream of image frames captured by a digital camera of a computing device. As used herein, an "object" identified within the image stream refers to a dominant or central object in the image stream such as the face of a viewer of a selfie. In one or more embodiments, the image stream is captured by a front-facing digital camera of a computing device. It follows that the digital media management system identifies an object in that image stream that includes the face of the user holding the computing device (e.g., the viewer).

Figure 1A:
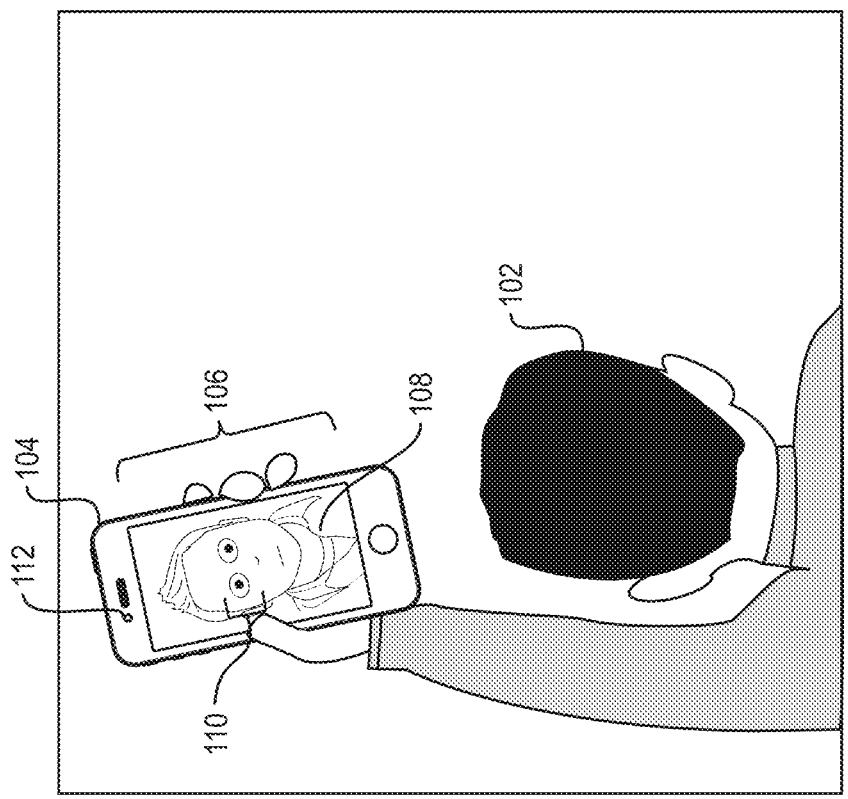

FIGS. 1A-1D illustrate an example embodiment of an interactive digital media content item provided by the digital media management system. As shown in FIG. 1A, a viewer 102 utilizes a computing device 104 to view a three-dimensional model 106 of a human head. For example, in one or more embodiments, the viewer 102 has previously installed all or a portion of the digital media management system on the computing device 104. In at least one embodiment, all or portions of the digital media management system are installed on the computing device 104 as a native application or callable action of a native application. For example, in response to the viewer 102 utilizing a social media application to view a social media post including a selfie (e.g., a two-dimensional digital photograph), the digital media management system identifies a face 108 in the selfie and builds the three-dimensional model 106 of the identified face 108 or head. The process by which the digital media management system generates the three-dimensional model 106 is further described below with reference to FIGS. 3 and 4.

In one or more embodiments, and in response to generating the three-dimensional model 106, the digital media management system provides the three-dimensional model 106 for viewing as an interactive media item via a display of the computing device 104. For example, the digital media management system can provide the three-dimensional model 106 in response to a detected selection of a social media post including the two-dimensional digital photograph from which the digital media management system generates three-dimensional model 106. Alternatively, the digital media management system can automatically provide the three-dimensional model 106 as a replacement or overlay for the social media post including the two-dimensional digital photograph.

The digital media management system performs additional processes in parallel with the processes of generating and providing the three-dimensional model 106 via the viewer's computing device. For example, in at least one embodiment, the digital media management system also identifies an object (e.g., viewer) within an accessed image stream from a digital camera 112 associated with the viewer's computing device 104. In order to identify an object, the digital media management system can utilize computer vision techniques to identify a face (e.g., the face of the viewer 102) in the image stream provided by the digital camera 112. For example, the digital media management system can utilize facial recognition techniques, facial measurement techniques, and point tracking techniques.

In one or more embodiments, the digital media management system utilizes the object in the image stream to determine the direction and magnitude of any movement of the object relative to the computing device 104. For example, after identifying the object in the image stream, the digital media management system can extrapolate a distance and viewing angle between the computing device 104 and the object (e.g., the viewer 102). In at least one embodiment, the digital media management system then calculates coordinates of a center point associated with the object relative to image stream provided by the digital camera 112 of the computing device 104. As the digital media management system continues to sample frames from the image stream provided by the digital camera 112 (e.g., at a rate of ten frames per second), the digital media management system determines the movement of the computing device 104 based on changes to the center point associated with the object in the image stream. The process by which the digital media management system calculates and monitors the center point associated with the object is described in greater detail below with reference to FIGS. 3 and 5.

As shown in FIG. 1A, the three-dimensional model 106 can include a portion 110 including the eyes of a human face. Additional portions can include the mouth of the face, the nose of the face, the forehead of the face, and so forth. In response to identifying an object (e.g., the face of the viewer 102) in the image stream provided by the digital camera 112 and calculating center point coordinates associated with the identified object, the digital media management system moves one or more portions of the three-dimensional model 106 based on the calculated center point coordinates. For example, as shown in FIG. 1B, the digital media management system moves the eyes 110 of the three-dimensional model 106 to directed at the center point coordinates associated with the object (e.g., viewer) identified in the image stream from the digital camera 112. The effect of this update to the three-dimensional model 106 is that it appears to the viewer 102 as though the eyes in the selfie are looking directly at the viewer 102 holding the computing device 104. The process by which the digital media management system moves the portion 110 of the three-dimensional model 106 is described in greater detail below with reference to FIGS. 3 and 6.

In one or more embodiments, the digital media management system continues to move one or more portions of the three-dimensional model 106 based on detected movement of the computing device 104. The digital media management system calculates center point coordinates associated with the object in the image stream at a regular rate (e.g., ten frames per second). In response to determining that the center point coordinates have changed (e.g., indicating movement of the computing device 104 relative to the viewer 102), the digital media management system moves one or more portions of the three-dimensional model 106 based on the new center point coordinates. For example, as shown in FIG. 1C, in response to the viewer 102 moving the computing device 104 to the left along the directional arrow, the digital media management system moves the portion 110 (e.g., the eyes of the face 108) of the three-dimensional model 106 such that the portion 110 remains oriented toward the center point coordinates associated with the object in the image stream from the digital camera 112 (e.g., the viewer 102). In additional embodiments, the digital media management system moves two or more portions of the three-dimensional model 106 such that it appears as though the three-dimensional model 106 follows the identified object (e.g., viewer) in the image stream associated with the computing device 104.

Figure 1D:
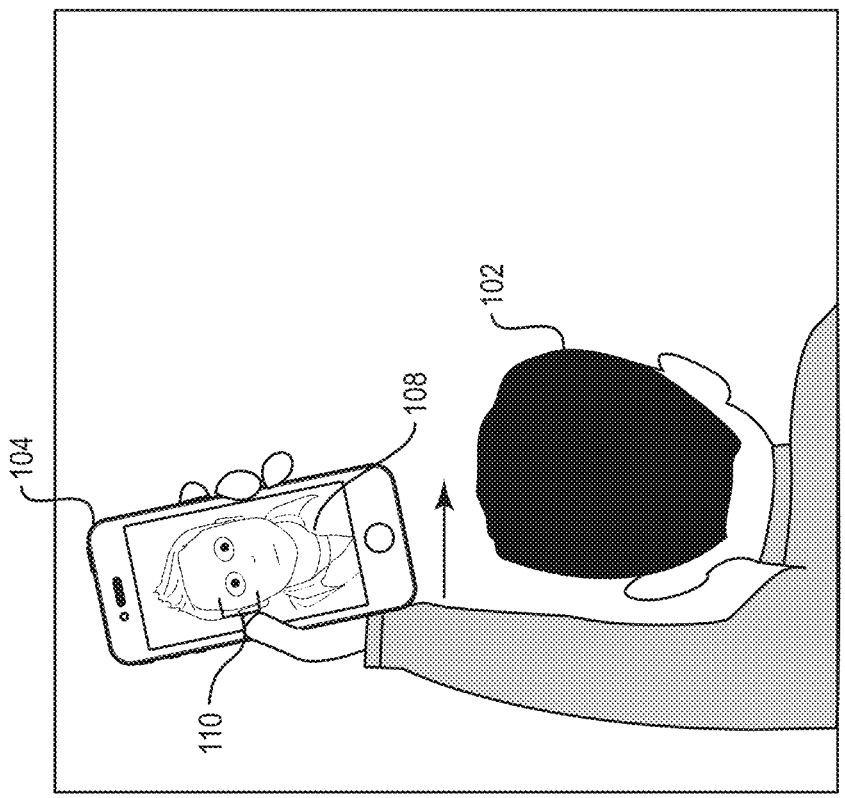
Figure 1C:
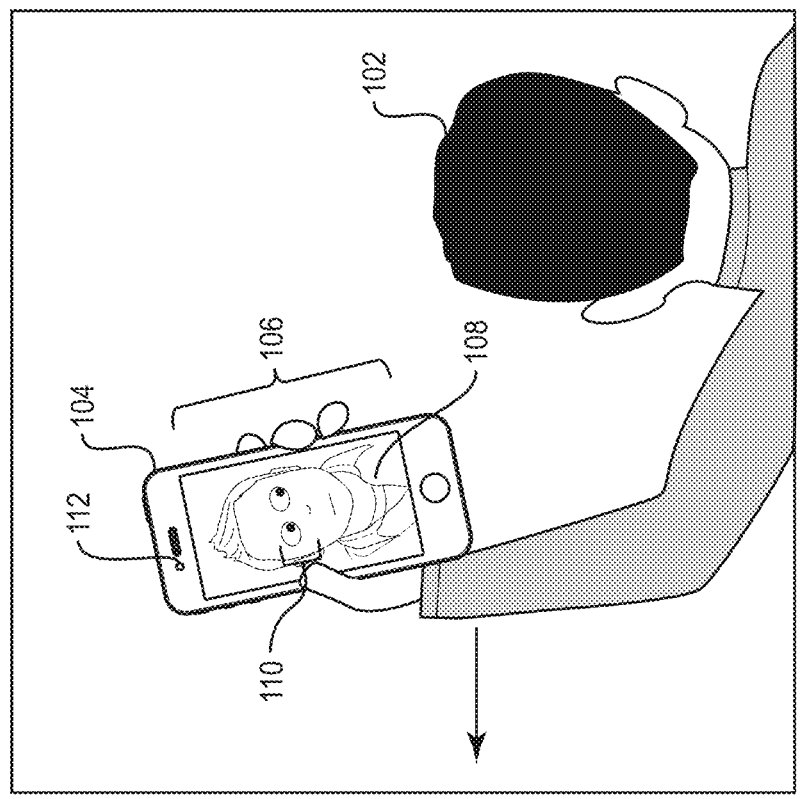

As shown in FIG. 1D, the digital media management system continually moves the portion 110 of the three-dimensional model 106 in response to further detected movement of the viewer relative to the computing device 104 along the directional arrow relative to the viewer 102. In response to determining that the center point coordinates associated with the object identified in the image stream associated with the computing device 104 have not changed for a threshold amount of time (e.g., indicating the computing device 104 has remained stationary relative to the viewer 102), the digital media management system can update one or more portions of the three-dimensional model 106 in a pre-configured manner. For example, the digital media management system can update the eye portion of the three-dimensional model 106 to appear to blink at regular intervals, can update the eye and mouth portions of the three-dimensional model 106 to appear to make a funny face, and so forth.

FIGS. 1A-1D illustrate the process by which the digital media management system identifies the viewer 102 alone in the image stream provided by the digital camera 112. In additional embodiments, the digital media management system can identify a dominant object to track in the image stream when multiple objects are in the image stream. For example, as shown in FIGS. 2A-2D, a second viewer 114 is close enough to the viewer 102 to also be captured in the image stream provided by the digital camera 112. Accordingly, the digital media management system can determine which face in the image stream to track for purposes of updating the interactive digital media item 106.

In one or more embodiments, the digital media management system determines which face in the image stream to identify as the dominant object based on proximity relative to the computing device 104. For example, in at least one embodiment, the digital media management system operates under the heuristic that, when there is more than one face depicted in the image stream, the closest face to the digital camera 112 should be identified as the dominant object. Accordingly, the digital media management system can utilize facial recognition and other computer vision techniques to determine which face is closest to the digital camera 112. For instance, the digital media management system can compare facial measurements (e.g., distance between eyes, distance between ears) to determine which face is nearest the digital camera 112.

Alternatively, the digital media management system can determine which face in the image frame stream to identify as the dominant object based on other considerations. For example, the digital media management system can determine which face to identify as the dominant object based on social media activity history associated with the computing device 104. In one or more embodiments, the social media activity history associated with the computing device 104 includes a list of social media co-users (e.g., "friends") of the user of the computing device 104 (e.g., the viewer 102), comments made by the user of the computing device 104, digital media and posts the user of the computing device 104 has "liked," profile information associated with the user of the computing device 104 including family members and co-workers, and so forth. Then, in connection with facial recognition techniques, the digital media management system can identify social media profiles associated with the viewer 102, the second viewer 114, and the person depicted in the selfie displayed on the computing device 104. The digital media management system can then determine that the person depicted in the selfie engages in a higher level of social media activity related to the viewer 102 than with the second viewer 114. In response to this determination, the digital media management system can identify the viewer 102 as the dominant object.

In yet additional embodiments, the digital media management system can determine which face to identify the dominant object based on an analysis of other information provided by the computing device 104. For example, the digital media management system can analyze contacts information, calendar information, text messaging information, and email information in combination with facial recognition techniques to determine the person portrayed in the three-dimensional model 106 interacts more frequently with the viewer 102 than with the second viewer 114. In response to this determination, the digital media management system can identify the viewer 102 as the dominant object.

Figure 2A:
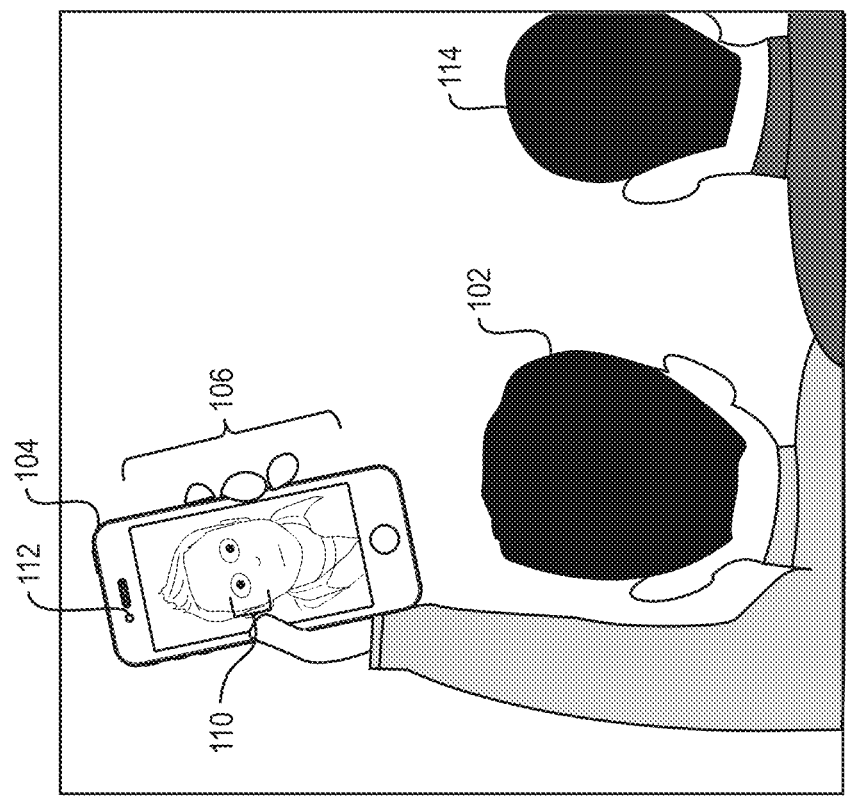
FIGS. 2A-2D illustrate a demonstration of two viewers utilizing a computing device to view an interactive digital media item in accordance with one or more embodiments.
Figure 2B:
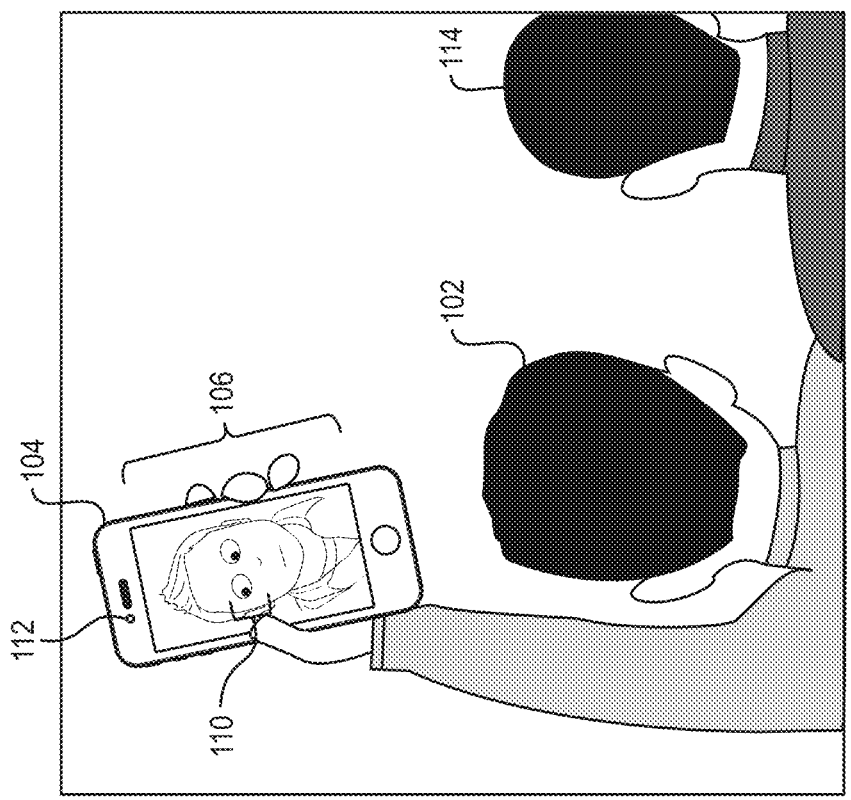
Figure 2C:
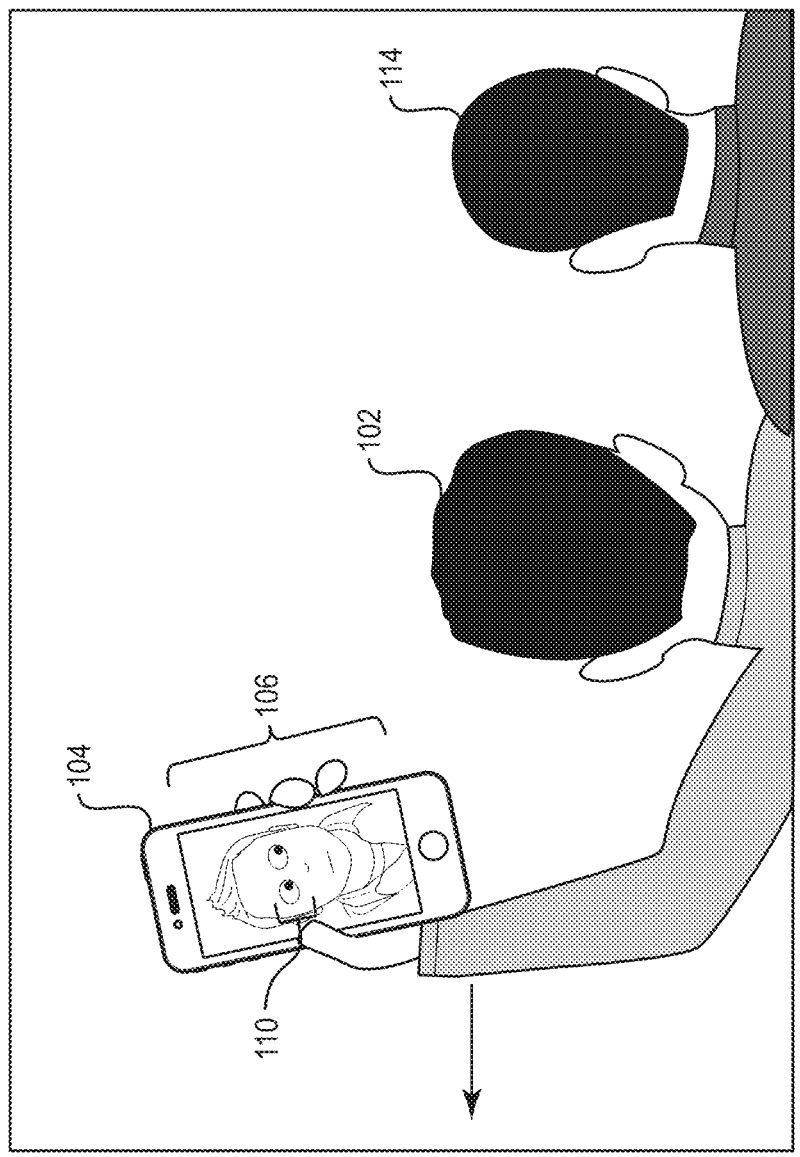
Figure 2D:
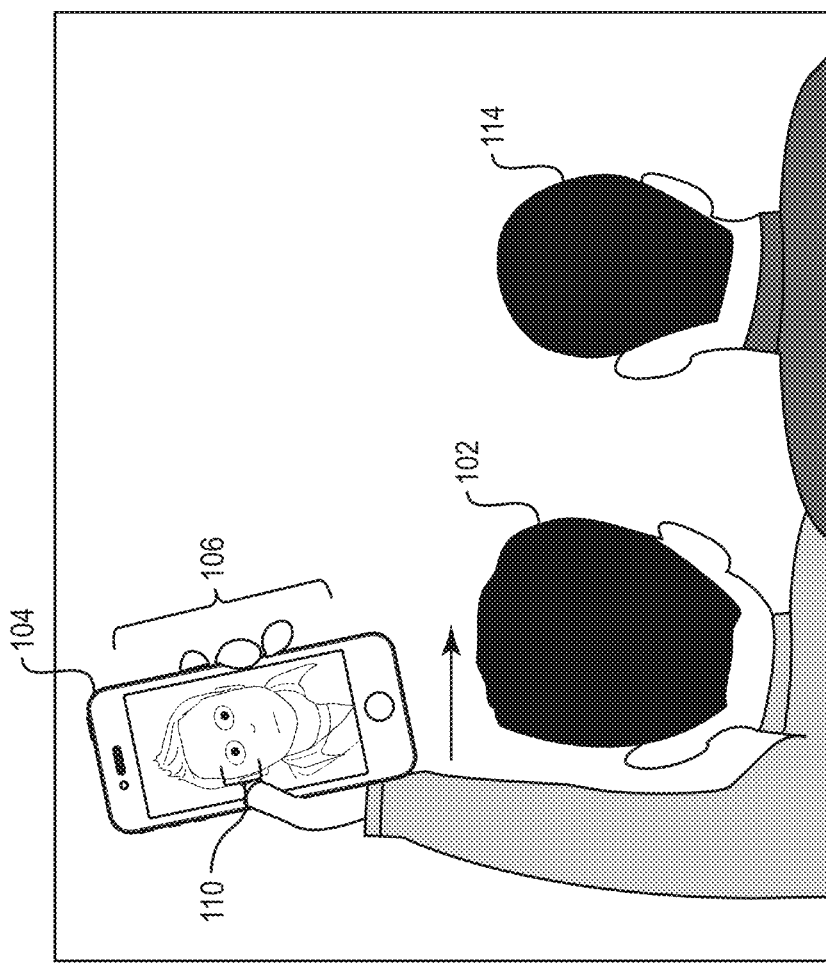

After determining which viewer (e.g., the viewer 102 or the second viewer 114) is the dominant object, the digital media management system detects movement of the computing device 104 relative to that dominant object and updates the three-dimensional model 106 based on the relative movement of the computing device 104 and the dominant object in the same manner as described above with reference to FIGS. 1A-1D. For example, as shown in FIG. 2B, in response to identifying the viewer 102 as the dominant object, the digital media management system moves the portion 110 of the three-dimensional model 106 based on the position of the viewer 102 relative to the computing device 104. Then, in response to detecting movement of the computing device 104 (e.g., along the directional arrow as shown in FIG. 2C), the digital media management system moves the portion 110 of the three-dimensional model 106 based on the updated position of the viewer 102 relative to the computing device 104. Following this, in response to detecting another movement of the computing device 104 (e.g., along the directional arrow as shown in FIG. 2D back toward the viewer 102), the digital media management system again moves the portion 110 of the three-dimensional model 106. The effect of the changes to the three-dimensional model 106 illustrated in FIGS. 2B-2D is that the eyes of the selfie displayed on the computing device 104 appear to follow the viewer 102 as the computing device 104 moves from one position to the next.

FIGS. 1A-1D illustrate embodiments in which the digital media management system updates or moves eyes of an interactive digital media item in response to movements of a viewer. In alternative embodiments, the digital media management system can update or move the head in addition to the eyes. In still further embodiments the digital media management system can update or move the eye brows, lips, or other portion of the digital media management system in response to movement of the viewer.

Figure 3:
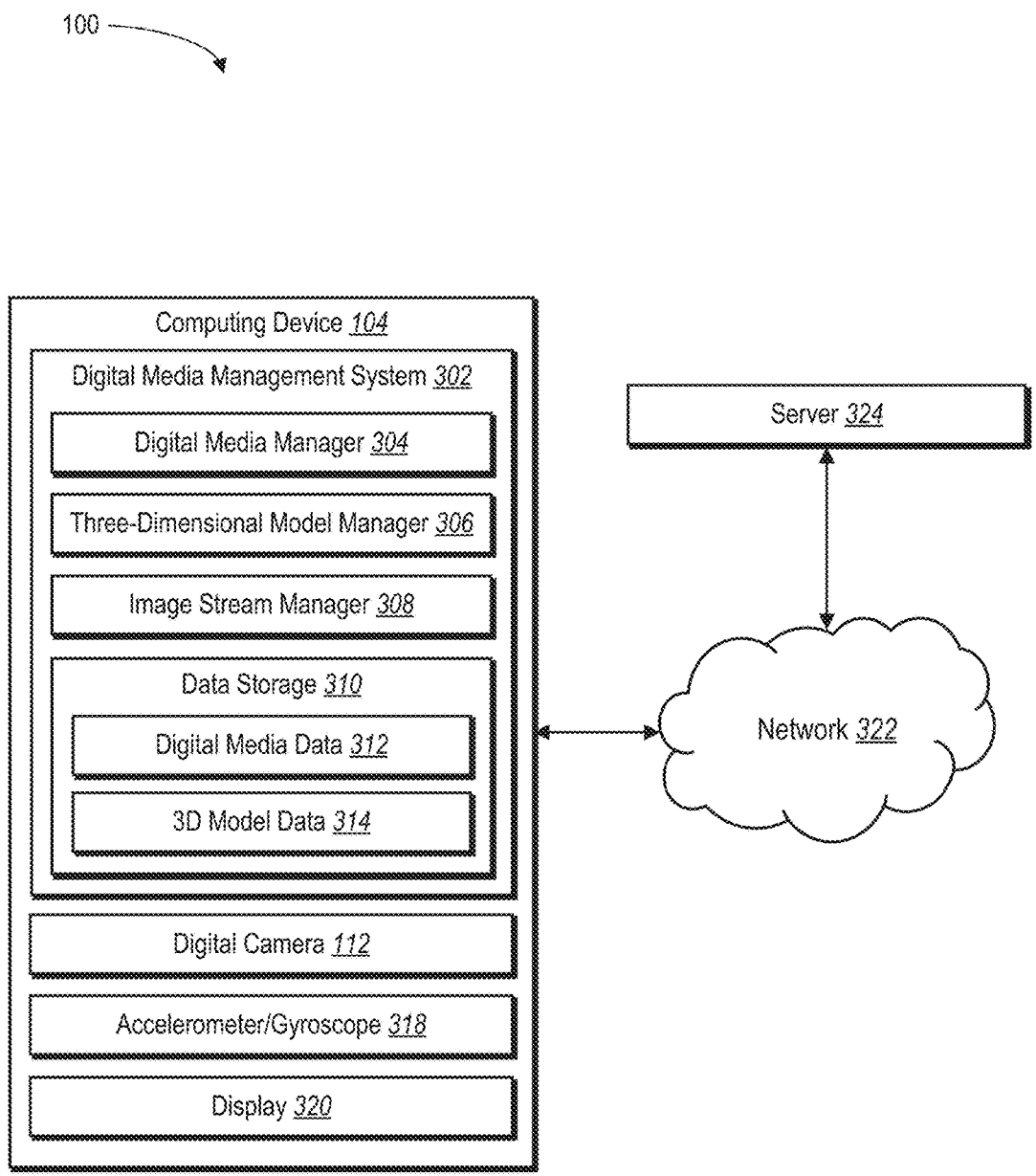
FIG. 3 illustrates a schematic diagram of an environment in which a digital media management system operates in accordance with one or more embodiments.

FIG. 3 illustrates an example architecture for the digital media management system 302 and in environment 100 in which the digital media management system 302 can operate. As shown in FIG. 3, the environment 100 includes the computing device 104 on which the digital media management system 302 is installed. The computing device 104 includes a digital camera 112, an accelerometer/gyroscope 318, and a display 320. As further illustrated in FIG. 3, the digital media management system 302 includes a digital media manager 304, a three-dimensional model manager 306, an image stream manager 308, and a data storage 310 including digital media data 312 and 3D model data 314.

Also, shown in FIG. 3, the environment 100 includes a network 322 and a server 324. In one or more embodiments, network 322 may connect the computing device 104 and the server 324 to each other and provide for the exchange of data there between. Additional information regarding network 322 is provided below in reference to FIG. 3. The computing device 104 may include a client computing device such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. The computing device 104 may enable a user at the computing device 104 to access the network 322. The computing device 104 may enable its user to communicate with other users at other client devices.

In one or more embodiments, the server 324 may be capable of linking a variety of entities. As an example, and not by way of limitation, the server 324 may enable users to interact with each other as well as receive content from third-party systems or other entities, or to allow users to interact with these entities through an application programming interfaces (API) or other communication channels.

In one or more embodiments, the server 324 may include a variety of servers, sub-systems, programs, modules, logs, and data stores. In particular embodiments, the server 324 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. The server 324 may also include suitable components such as network interfaces, security mechanisms, load balancers, failover servers, management-and-network-operations consoles, other suitable components, or any suitable combination thereof.

Although the disclosure herein shows the components of the digital media management system to be separate in FIG. 3, any of the components of the digital media management system may be combined into fewer components, such as into a single facility of module, or divided into more components as may serve one or more embodiments. Additionally, the components of the digital media management system may be located on, or implemented by, one or more computing devices, such as those described below in relation to FIG. 8. For example, in one embodiment, the digital media management system 302 is operated by a server. In such an embodiment, the computing device 104 provides movement information (e.g., an image stream from the digital camera 112) to the server 324, and receives a display stream of a three-dimensional model that is constantly updated in response to the provided information. Alternatively, the digital media management system 302 may be installed as a native application, a web browser plugin, or another type of application plugin (e.g., a social media application plugin) on the computing device 104.

In one or more embodiments, the components of the digital media management system comprise software, hardware, or both. For example, the components of the digital media management system can comprise computing instructions stored on a non-transitory computer-readable storage medium and executable by at least one processor of the computing device 104. When executed by the at least one processor, the computer-executable instructions cause the computing device 104 to perform the methods and processes described herein. Alternatively, the components of the digital media management system can comprise hardware, such as a special purpose processing device to perform a certain function or group of functions. Additionally, the components of the digital media management system can comprise a combination of computer-executable instructions and hardware.

As shown in FIG. 3, and as mentioned above, the computing device 104 includes one or more portions/components of the digital media management system 302. As mentioned above, the digital media management system 302 can be a standalone native application. Alternatively, the digital media management system 302 can be a background process or application plugin.

As shown in FIG. 3, the digital media management system 302 includes the digital media manager 304. In at least one embodiment, the digital media manager 304 provides access to digital media items (e.g., digital photographs, digital videos) via cloud storage, via a social media system, or via local storage. Further, the digital media manager 304 enables a user of the computing device 104 to view and edit digital media items. Additionally, in at least one embodiment, the digital media manager 304 enables the user of the computing device 104 to engage in social media activities relative to one or more digital media items (e.g., comment on a post including a digital photograph). Moreover, in one or more embodiments, the digital media manager 304 sends and receives digital media items, information associated with digital media items (e.g., editing information, social media activity information), and other information utilized by the digital media management system (e.g., image frame stream information from the computing device 104, three-dimensional models generated at the server 324).

Further illustrated in FIG. 3, and as mentioned above, the digital media management system 302 includes the three-dimensional model manager 306. In one or more embodiment, the three-dimensional model manager 306 identifies a face in a digital media item (e.g., a two-dimensional digital photograph), generates a three-dimensional model of the identified face and/or an associated head, and moves one or more portions of the three-dimensional model based on movement information from the computing device 104.

For example, the three-dimensional model manager 306 detects a two-dimensional face in a digital photograph by utilizing computer vision techniques. For example, the three-dimensional model manager 306 can analyze clusters of pixel to identify common facial features (e.g., eyes, nose, mouth), and then work outward to identify the boundaries of the face in the digital photograph. One example method of detecting a two-dimensional face in a digital photograph is described in U.S. Pat. No. 9,679,192, the entirety of which is incorporated herein by reference.

The three-dimensional model manager 306 can operate using a heuristic that specifies the detected face should be a human face. In such an embodiment, the three-dimensional model manager 306 utilizes facial recognition techniques to identify the features of a human face. Alternatively, the three-dimensional model manager 306 can implement a heuristic that specifies the face can be any face including a human face, an animal face, or an anthropomorphized face (e.g., a cartoon character face, facial features added to a plant or other object). In one or more embodiments, the three-dimensional model manager 306 detects a face that includes head hair, facial features, a neck, shoulders, and possibly the upper torso of a person, or otherwise.

Additionally, the three-dimensional model manager 306 generates a three-dimensional model of the detected two-dimensional face or a head. The process by which the three-dimensional model manager 306 generates a three-dimensional model is described in greater detail with reference to FIG. 4.

The three-dimensional model manager 306 also updates the three-dimensional model based on movement information from the computing device 104. For example, in one or more embodiments, and as will be described further below, the computing device 104 provides movement information indicating a degree and direction of movement associated with the computing device 104. In response to receiving this information, the three-dimensional model manager 306 moves one or more portions of the three-dimensional model of the digital photograph object to mirror the indicated degree and direction of movement associated with the computing device 104.

For example, in one or more embodiments, the three-dimensional model manager 306 segments the three-dimensional model into multiple components where each component corresponds to an area of the face represented by the three-dimensional model. For instance, a single component of the three-dimensional model can include a single eye of the represented face. In at least one embodiment, the three-dimensional model manager 306 moves one or more portions of the three-dimensional model by determining an axis of rotation within the three-dimensional model relative to each of the one or more portions, and rotating the corresponding components within the model about their relative axes at a magnitude that based on the detected movement of the computing device 104. To illustrate, in response to receiving movement information indicating the computing device 104 has moved eight inches to the right (e.g., from the viewer's point-of-view), the three-dimensional model manager 306 rotates the components corresponding to the eye portion of the three-dimensional model of a human face (e.g., the components corresponding to each eye) to follow to the indicated movement. Additional disclosure relating to generating, updating, and moving portions of a three-dimensional model can be found in U.S. Pat. No. 9,679,192, the entirety of which is incorporated herein by reference.

As mentioned above and as illustrated in FIG. 3, the digital media management system 302 includes the image stream manager 308. In one or more embodiments, the image stream manager 308 identifies an object in an image stream, calculates and provides center point coordinates associated with the object relative to the computing device 104 at regular intervals, and determines movement associated with the computing device 104 based on the calculated coordinates and other signals. In at least one embodiment, the image stream manager 308 provides the results of its analyses and determinations to one or more additional modules in the digital media management system 302.

As just mentioned, the image stream manager 308 identifies an object in an image stream. For example, the image stream manager 308 can receives an image stream from the digital camera 112 (e.g., either locally or over a network connection). In particular, the digital media management system 302 can active the digital camera 112 as a background process. In other words, the image stream captured by the digital camera 112, in one or more embodiments, is not surfaced or displayed via the client device but rather analyzed by the image stream manager 308. In one or more embodiments, the digital media management system 302 activates the digital camera 112 in response to receiving a digital image to process into an interactive digital media item or in response to receiving a three-dimensional model.

In one or more embodiments, the image stream manager 308 samples image frames at regular intervals (e.g., ten frames per second) from the provided image stream to identify and track an object. In at least one embodiment, the image stream manager 308 identifies an object by performing facial recognition in connection with an image frame from the image stream. Alternatively, the image stream manager 308 can utilize other computer vision techniques to identify an object in an image frame from the image stream. In one or more embodiments, if more than one face is identified within an image frame, the image stream manager 308 identifies a dominant object by determining the closest face relative to the computing device 104 or using one of the techniques described above.

As mentioned above, the image stream manager 308 can also calculate and provide center point coordinates associated with an object relative to the computing device 104 at regular intervals to continuously track the object. More detail regarding tracking an object in a video stream is provided in greater detail in relation to FIG. 5.

The image stream manager 308 also determines movement associated with the computing device 104 based on the calculated coordinates described above and other signals. For example, in at least one embodiment, the image stream manager 308 determines movement associated with the computing device 104 based on the calculated center point coordinates by extrapolating direction and velocity of movement from changes in the center point coordinates over time. To illustrate, in one embodiment, the image stream manager 308 identifies updated center point coordinates for a focus object every two seconds. If a first set of center point coordinates is (1,2) and a second set of center point coordinates is (4,2), the image stream manager 308 can determine that, in the last two seconds, the computing device 104 has moved a distance to the left. In at least one embodiment, the image stream manager 308 determines the distance of movement by determining how far the object is from the digital camera 112 and extrapolating the distance of movement over time (e.g., two seconds).

In addition to determining movement based on the calculated coordinates, the image stream manager 308 also determines movement associated with the computing device 104 based on other signals. For example, in one or more embodiments, the image stream manager 308 determines movement associated with the computing device 104 based on information captured and provided by the accelerometer/gyroscope 318. In at least one embodiment, the accelerometer/gyroscope 318 provides information indicating direction, velocity, and rotation associated with any movement of the computing device 104. Utilizing this information, the image stream manager 308 can further update the calculated center point coordinates associated with the object detected in the image stream. In one or more embodiments, the image stream manager 308 provides the calculated and updated center point coordinates associated with the object to the three-dimensional model manager 306 as described in greater detail in relation to FIG. 6.

The digital media management system 302 further includes the data storage 310 including digital media data 312 and 3D model data 314. In one or more embodiments, the digital media data 312 includes digital media information, such as discussed herein. In one or more embodiments, the 3D model data 314 includes three-dimensional modal information, such as discussed herein.

As further illustrated in FIG. 3, the computing device 104 includes one or more digital cameras 112. In one or more embodiments, the digital camera 112 is a front-facing digital camera associated with a personal computing device (e.g., a smart phone, a smart wearable). In additional or alternative embodiments, the digital camera 112 can be a webcam, or other type of digital camera. Regardless of the type associated with the digital camera 112, the digital camera 112 is capable of capturing an image frame stream of the user of the computing device 104 (e.g., the viewer).

Further illustrated in FIG. 3, the computing device 104 includes an accelerometer/gyroscope 318. In one or more embodiments, the accelerometer/gyroscope 318 detects movement of the computing device 104. For example, the accelerometer/gyroscope 318 measures movement along one or more planes, as well as rotational movement associated with the computing device 104.

Additionally, as shown in FIG. 3, the computing device 104 includes the display 320. In one or more embodiments, the display 320 includes a touch screen display of a personal computing device. For example, the user of the computing device 104 can interact with one or more digital media items via the display 320.

Figure 4:
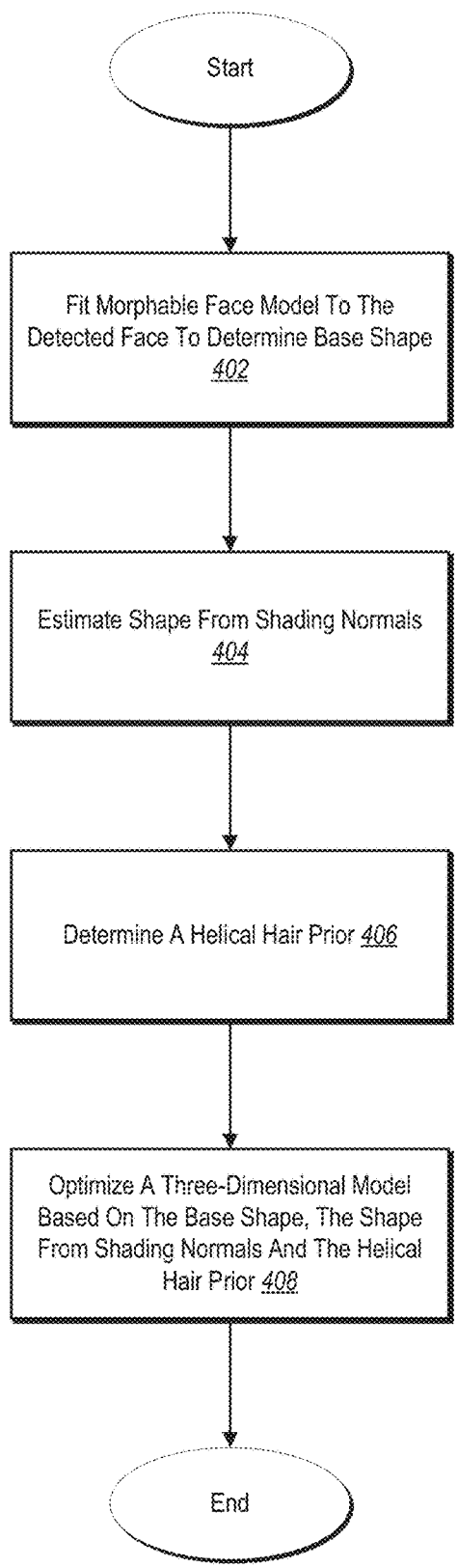
FIG. 4 illustrates an example algorithm for performing a step for generating a three-dimensional model in accordance with one or more embodiments.

FIG. 4 illustrates one example of an algorithm for performing a step for building a three-dimensional model of a detected face. For example, as shown in FIG. 4, the process by which the three-dimensional model manager 306 generates a three-dimensional model of the detected face begins with a step 402 wherein the three-dimensional model manager 306 fits a morphable face model to the detected two-dimensional face in order to determine a base shape of the detected face. For example, morphable face models represent face geometry as a linear combination of low-dimensional basis vectors. The three-dimensional model manager 306 computes this low-dimensional space using principle component analysis on captured 3D face geometry data. The resulting model captures the variation in face geometry over different identities and expressions. Additional disclosure relating to fitting a morphable face model to the detected face in a three-dimensional model can be found in U.S. Pat. No. 9,679,192, the entirety of which is incorporated herein by reference.

The resulting morphable face model fit to the detected face provides the coarse geometry with the right pose, identity, and expression of the detected face in the two-dimensional media item. For example, the three-dimensional model manager 306 derives and uses the low-resolution surface normal of this coarse geometry to infer the environment lighting from the observed image intensities in the detected face. Further, the three-dimensional model manager represents the lighting in the morphable face model using a quadratic lighting model which generally approximates natural illumination. The resulting base shape guides the construction of the three-dimensional model of the detected face. Additional disclosure relating to combining multiple models into a single optimization framework can be found in U.S. Pat. No. 9,679,192, the entirety of which is incorporated herein by reference.

Next, in the step 404, the three-dimensional model manager 306 estimates shape from shading normals (e.g., "SFS-normals), which produce realistic face reconstructions. In one or more embodiments, the three-dimensional model manager 306 estimates SFS-normals on a per-pixel basis for face and hair in the detected face. For example, the three-dimensional model manager 306 utilizes the estimated SFS-normals to construct a low-frequency portrait base shape to guide the reconstruction based on one or more face models and silhouettes of hair and body. In one or more embodiments, the three-dimensional model manager 306 utilizes the SFS-normals to capture local variations in geometry. In one or more embodiments, reconstruction utilizing SFS-normals and the base shape only partially recovers hair structures. As such, the three-dimensional model manager 306 next performs step 406 and determines a helical hair prior. For example, the three-dimensional model manager 306 models hair strands as piece-wise helices. Additional disclosure relating to the utilization of SFS-normals can be found in U.S. Pat. No. 9,679,192, the entirety of which is incorporated herein by reference.

Finally, in step 408, the three-dimensional model manager 306 optimizes a three-dimensional model of the detected two-dimensional face from the two-dimensional digital photograph based on the base shape, the SFS-normals, and the helical hair prior. For example, the three-dimensional model manager 306 can optimize the three-dimensional model using different energy terms:

$$E = \lambda_n E_n + \lambda_b E_b + \lambda_h E_h$$

where $E_n$, $E_b$, and $E_h$ are the energies for SFS-normals, the base shape, and the helical hair prior, respectively. The resulting generated three-dimensional model include one or more portions that form a three-dimensional representation of the detected face. For example, if the detected face is a human face, the three-dimensional model manager 306 generates the corresponding three-dimensional model to include portions including the eyes of the human face, the mouth of the human face, the cheeks of the human face, the chin of the human face, the forehead of the human face, and so forth.

In additional or alternative methods, the three-dimensional model manager 306 can generate a model of the selfie taker's face using a 2D warping method. For example, the three-dimensional model manager 306 can perform 2D warping on a face in a two-dimensional image by mapping a coordinate matrix to the face in the two-dimensional image. In response to detected motion of the computing device 104, the three-dimensional model manager 306 skews or deforms certain points within the coordinate matrix that correlate with one or more portions of the underlying face (e.g., the eyes of the face). This skewing of the points within the coordinate matrix causes the correlated portions of the face to change appearance. Further, in at least one embodiment, the three-dimensional model manager 306 can generate a three-dimensional model of a face from a digital video input, in much the same manner as described above regarding a two-dimensional digital photograph.

Figure 5:
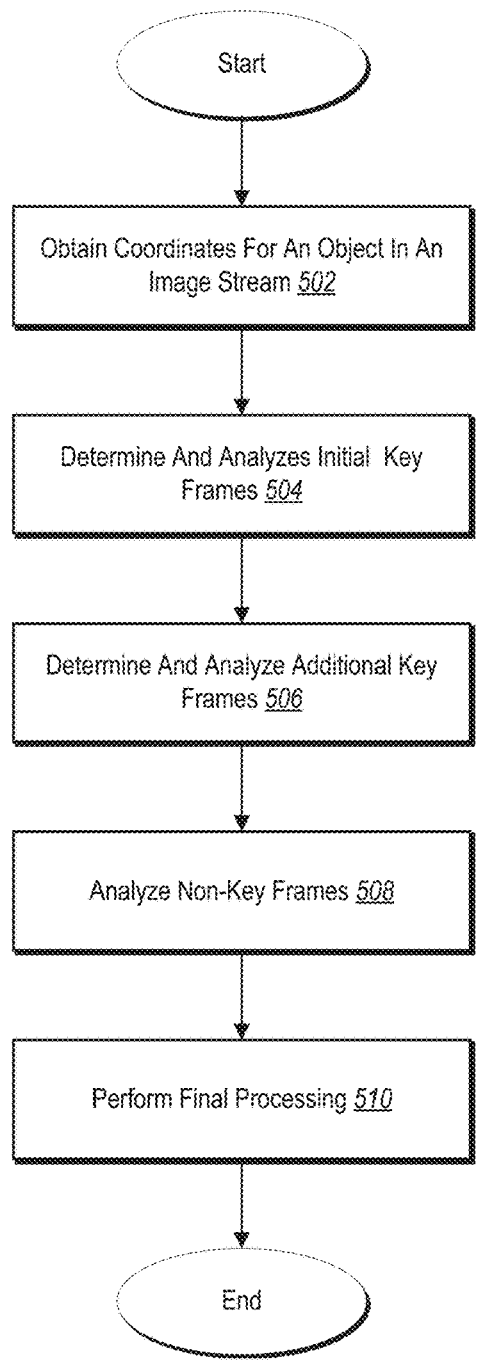
FIG. 5 illustrates an example algorithm for performing a step for tracking an object across one or more image frames in accordance with one or more embodiments.

FIG. 5 illustrates one example of an algorithm for performing a step for performing a step for tracking a position of an object within an image stream. For example, as illustrated in FIG. 5, the image stream manager 308 begins at a step 502 by obtaining center point coordinates for the detected object in an image frame from the image stream. In one or more embodiments, the center point coordinates for the detected object are the center of the face of the person detected in the image frame. For example, the image stream manager 308 calculates the center point coordinates of the center of a face in an image frame, and determines the relative distance of that center point from the edges of the image frame. In order to generally track the face in the image frame stream, the image stream manager 308 determines and analyzes initial key frames in the image frame stream, in the step 504. For example, the image stream manager 308 samples key frames from the image stream at a regular interval (e.g., ten frames per second) and calculates the center point coordinates of the face in each key frame along with the relative distance from the center point coordinates to the edges of each key frame.

The image stream manager 308 can smooth the tracking of the object (e.g., the face) by determining and analyzing additional key frames from the image stream in step 506. For example, the image stream manager 308 can analyze image frames in the image stream in addition to those taken at the regular interval. Further, in at least one embodiment, the image stream manager 308 can analyze all the image frames in the image frame stream including the non-key frames, as in step 508. In one or more embodiments, the image stream manager 308 analyzes key frames, additional key frames, and non-key frames to identify the object in each image frame and calculate center point coordinates for the object in each image frame. In at least one embodiment, the coordinates for the object in an image frame define a center of the face in the image frame and are represented as a pixel pair correlating to the X and Y planes. Additionally, the center point coordinates for the object in the image frame can define a center of an entire torso.

In step 510, the image stream manager 308 performs final processing on the calculated center point coordinates for the object across the series of image frames analyzed in steps 504-508. For example, in one or more embodiments, the image stream manager 308 performs the steps 502-510 in connection with every two seconds of image stream provided by the digital camera 112. Accordingly, the image stream manager 308 performs the final processing in step 510 to output movement associated with the focus object. In at least one embodiment, the image stream manager 308 provides this movement information to the three-dimensional model manager 306 such that the three-dimensional model manager 306 can move one or more portions of a generated three-dimensional model. One process by which the image stream manager 308 can track the object across image frames is further disclosed in U.S. Pat. No. 8,873,846, the entirety of which is incorporated herein by reference. In still further embodiments, the image stream manager 308 can use other motion detection tools such as the core motion framework in iOS to aid in tracking. In still further embodiments, the image stream manager 308 can use KLT: Kanade-Lucas-Tomasi feature tracker or ORB: Oriented FAST and Rotated BRIEF method to aid in tracking.

Figure 6:
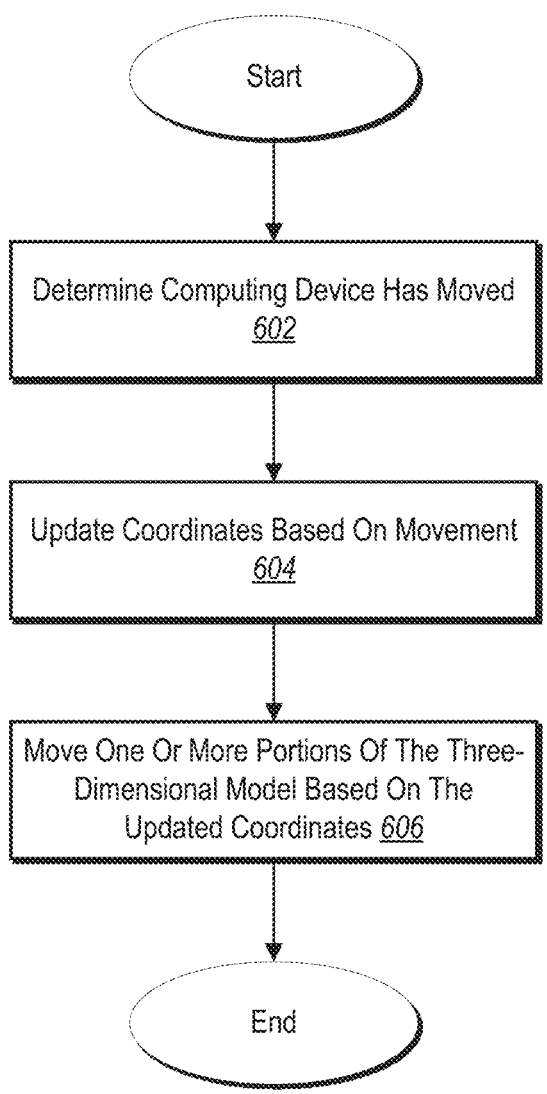
FIG. 6 illustrates an example algorithm for performing a step for moving one or more portions of a three-dimensional model in accordance with one or more embodiments.

FIG. 6 illustrates one example of an algorithm for performing a step for moving one or more portions of a three-dimensional model based on detected movement of a viewer. As illustrated in FIG. 6, the image stream manager 308 determines the computing device has moved in the step 602 in any of the ways described above. The image stream manager 308 then updates the center point coordinates for the object in the step 604. For example, as discussed above, the image stream manager 308 updates the coordinates of the center of the focus object relative to the computing device 104. The image stream manager 308 then provides the updated center point coordinates to the three-dimensional model manager 306. In one or more embodiments, the three-dimensional model manager 306 moves one or more portions of a three-dimensional model based on the updated coordinates in the step 606 (e.g., the three-dimensional model manager 306 moves the eyes of the face in the three-dimensional model). Alternatively, the three-dimensional model manager 306 can move one or more portions of the three-dimensional model that are preconfigured by the person depicted in the two-dimensional digital photograph upon which the three-dimensional model is built. In still further embodiments, the three-dimensional model manager 306 can use a 2D warping method to move one or more portions of a three-dimensional model based on detected movement of a viewer.

Figure 7:
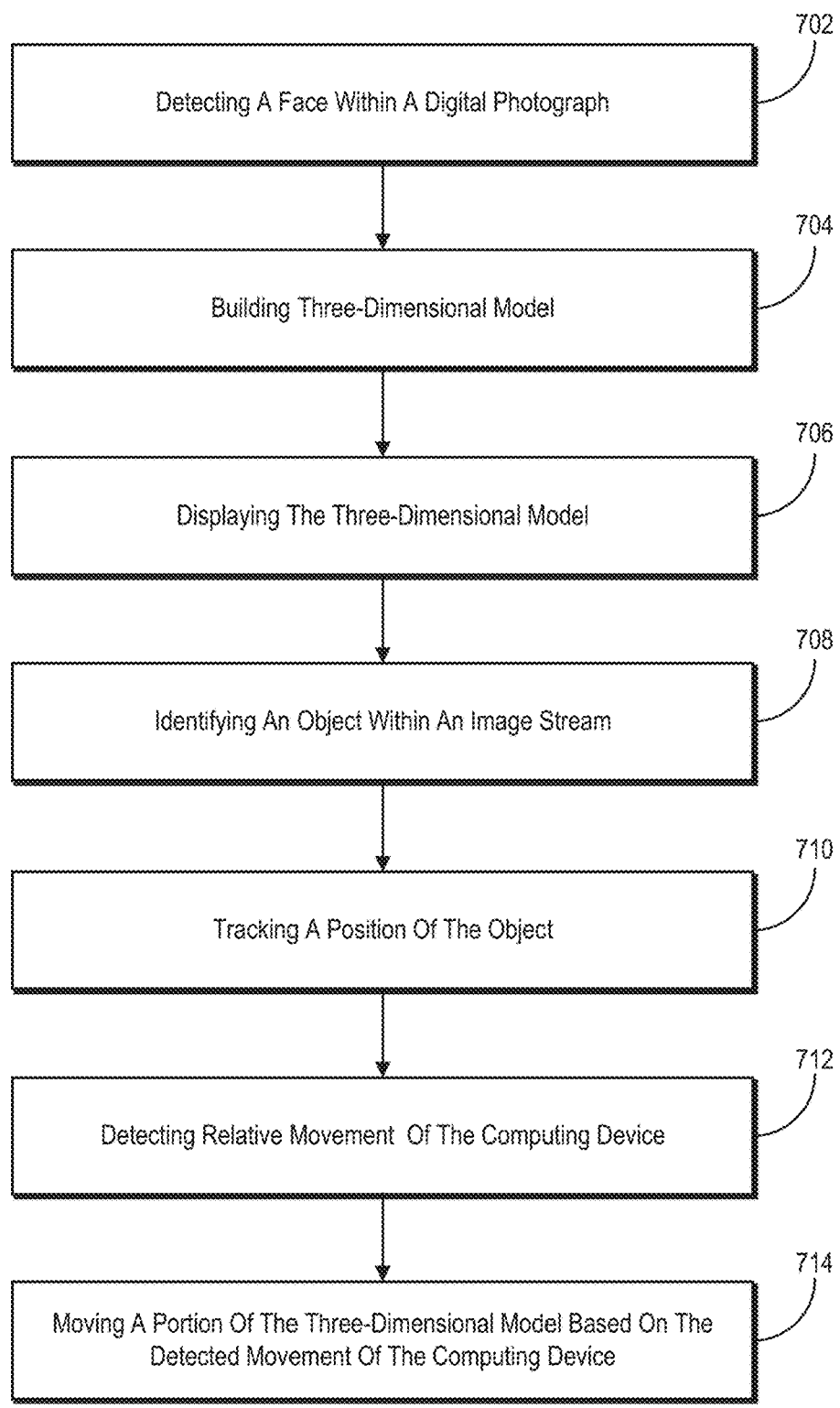
FIG. 7 illustrates a flowchart of steps in providing an interactive digital media item in accordance with one or more embodiments.

Turning now to FIG. 7, this figure illustrates a flowchart of a series of acts 700 of generating an interactive media item based on a two-dimensional selfie in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 702 of detecting a face within a digital photograph. For example, the act 702 can involve utilizing facial recognitions techniques to identify a human face, an animal face, or an anthropomorphized face.

Further, the series of acts 700 includes an act 704 of building a three-dimensional model. For example, the act 704 can involve building a three-dimensional model of the detected face. In one or more embodiments, building the three-dimensional model of the detected face is based on a morphable face model fit to the digital photograph object, estimated shape from shading normal, and a determined helical hair prior.

Additionally, the series of acts 700 includes an act 706 of displaying the three-dimensional model. For example, the act 706 can involve displaying the three-dimensional model of the face on a screen of the computing device. In one or more embodiments, displaying the three-dimensional model of the face can include displaying the three-dimensional model of the face as an overlay on a social media post including a selfie.

The series of acts 700 also includes an act 708 of identifying an object within an image stream. For example, the act 708 can involve identifying an object within an image stream from the computing device. In one or more embodiments, the acts 700 further include accessing the image stream from a front-facing camera of the computing device. In that embodiment, identifying the object within the image stream includes identifying a face within the image stream from the front-facing camera. In at least one embodiment, identifying the face within the image stream from the front-facing camera is based on one or more of facial recognition techniques, facial measurement techniques, or point tracking techniques.

The series of acts 700 further includes an act 710 of tracking a position of the object. For example, the act 710 can involve tracking a position of the object within the image stream. In one or more embodiments, tracking a position of the object within the image stream includes: identifying a center point of the face within the image stream from the front-facing camera, and detecting a change in coordinates associated with the center point of the face.

Further, the series of acts 700 includes an act 712 of detecting relative movement of the computing device. For example, the act 712 can involve detecting relative movement of the screen of the computing device and the object within the image stream. In one or more embodiments, detecting relative movement of the screen of the computing device and the object within the image stream includes, in response to detecting a change in coordinates associated with the center point of the face, extrapolating a degree of movement associated with the computing device. In at least one embodiment, detecting relative movement of the screen of the computing device and the object within the image stream is further based on one or more of accelerometer information provided by the computing device or gyroscopic information provided by the computing device.

Also, shown in FIG. 7, the series of acts 700 includes an act 714 of moving a portion of the three-dimensional model based on the detected movement of the computing device. For example, the act 714 can involve moving one or more portions of the three-dimensional model of the detected face based on the detected relative movement of the computing device so the one or more portions of the three-dimensional model of the detected face follow the object. In one or more embodiments, moving one or more portions of the three-dimensional model of the detected face includes moving the one or more portions to mirror the extrapolated degree of movement associated with the computing device.

Additionally, in some embodiments, the series of acts 700 further includes acts of determining there has been no detected relative movement of the screen of the computing device and the object within the image stream for a threshold amount of time, and moving one or more portions of the three-dimensional model of the detected face in a pre-configured manner. Further, in at least one embodiment, the series of acts 700 further includes acts of identifying a second object within the image stream from the computing device, determining whether the object or the second object is a dominant object within the image stream from the computing device, tracking a position of the dominant object within the image stream, detecting relative movement of the screen of the computing device and the dominant object within the image stream, and moving one or more portions of the three-dimensional model of the detected face based on the detected relative movement of the computing device so the one or more portion of the three-dimensional model of the detected face follow the dominant object. In that embodiment, determining whether the object or the second object is the dominant object within the image stream from the computing device is based on one or more of: determining which of the object or the second object is closer to the computing device; or analyzing, in combination with facial recognition techniques utilized on the object and the second object, one or more of contact information associated with the computing device, messaging information associated with the computing device, email information, calendar information associated with the computing device, or social media activity history associated with the computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
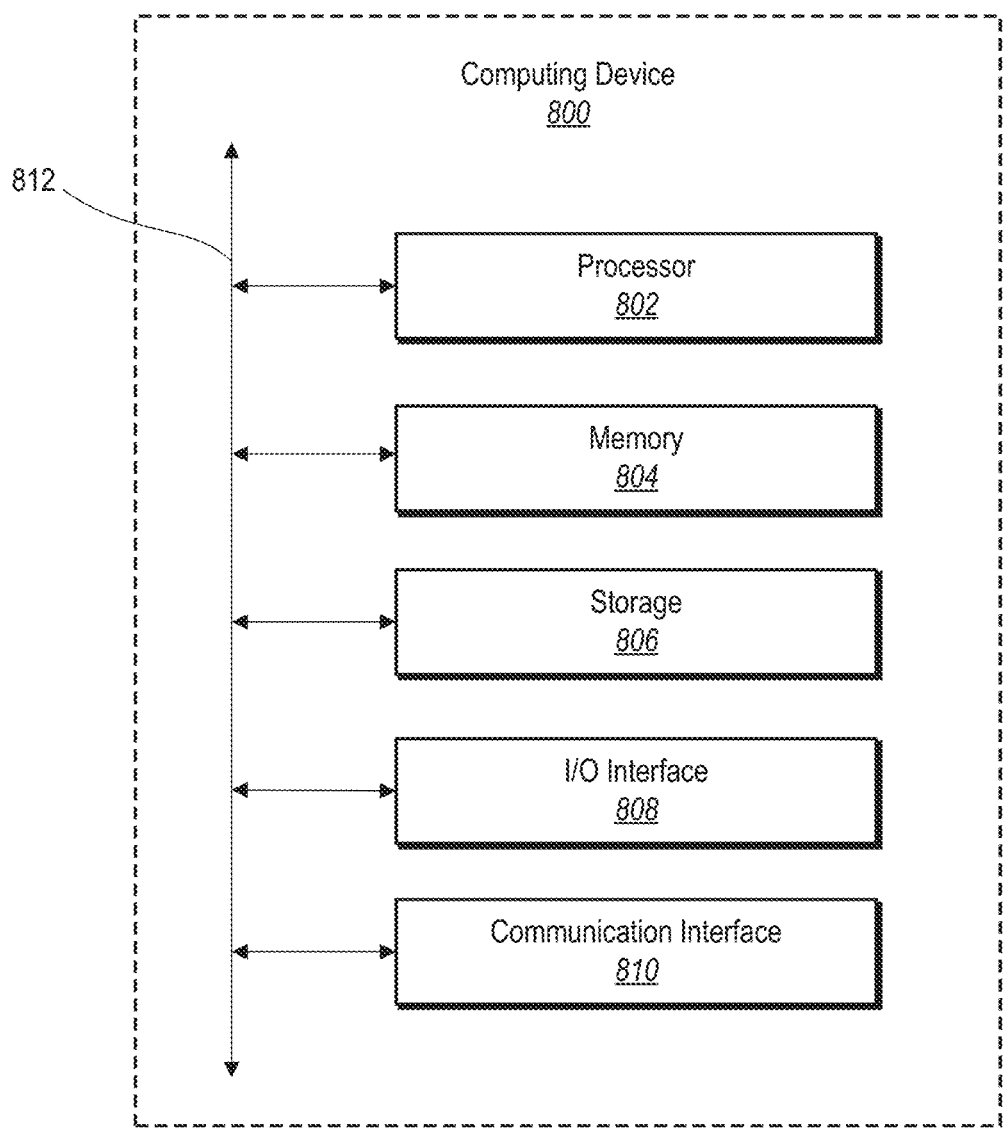
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the digital media management system can be implanted on implementations of the computing device 800.

As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory. In one or more embodiments, the memory 804 stores or comprises the data storage.

The computing device 800 includes a storage device 806 includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices. In one or more embodiments, the storage device 806 stores or comprise the data storage.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

We claim:

1. A non-transitory computer-readable storage medium having stored thereon computer-executable instructions that, when executed by a processor, cause a computing device to:
    detect a face within a digital photograph;
    build a three-dimensional model of the detected face;
    display the three-dimensional model of the face on a screen of the computing device;
    identify an object within an image stream from the computing device;
    track a position of the object within the image stream;
    detect relative movement of the screen of the computing device and the object within the image stream by extrapolating a degree of movement associated with the computing device in response to detecting a change in coordinates associated with the object; and
    move one or more portions of the three-dimensional model of the detected face based on the detected relative movement of the computing device so the one or more portions of the three dimensional model of the detected face follow the object.

2. The non-transitory computer-readable storage medium as recited in claim 1, wherein the computer-executable instructions, when executed by the processor, cause the computing device to build the three-dimensional model of the detected face by fitting a morphable face model fit to the detected face, estimating shape from shading normal, and a using a determined helical hair prior.

3. The non-transitory computer-readable storage medium as recited in claim 1, further comprising computer-executable instructions that, when executed by the processor, cause the computing device to:
    access the image stream from a front-facing camera of the computing device; and
    wherein identifying the object within the image stream comprises identifying a face within the image stream from the front-facing camera.

4. The non-transitory computer-readable storage medium as recited in claim 3, wherein the computer-executable instructions, when executed by the processor, cause the computing device to identify the face within the image stream from the front-facing camera using one or more of facial recognition techniques, facial measurement techniques, or point tracking techniques.

5. The non-transitory computer-readable storage medium as recited in claim 4, wherein the computer-executable instructions, when executed by the processor, cause the computing device to track the position of the object within the image stream by performing steps comprising:
    identifying a center point of the face within the image stream from the front-facing camera; and
    detecting a change in coordinates associated with the center point of the face within the image stream between image frames from the image stream.

6. The non-transitory computer-readable storage medium as recited in claim 5, wherein the computer-executable instructions, when executed by the processor, cause the computing device to extrapolate a degree of movement associated with the computing device in response to detecting a change in coordinates associated with the object by extrapolating a degree of movement associated with the computing device in response to detecting a change in coordinates associated with the center point of the face within the image stream.

7. The non-transitory computer-readable storage medium as recited in claim 6, wherein the computer-executable instructions, when executed by the processor, cause the computing device to further detect relative movement of the screen of the computing device by using one or more of accelerometer information provided by the computing device or gyroscopic information provided by the computing device.

8. The non-transitory computer-readable storage medium as recited in claim 7, wherein the computer-executable instructions, when executed by the processor, cause the computing device to move the one or more portions of the three-dimensional model of the detected face by moving the one or more portions to mirror the extrapolated degree of movement associated with the computing device.

9. The non-transitory computer-readable storage medium as recited in claim 1, further storing computer-executable instructions that, when executed by the processor, cause the computing device to:
    determine there has been no detected relative movement of the screen of the computing device and the object within the image stream for a threshold amount of time; and
    move one or more portions of the three-dimensional model of the detected face in a pre-configured manner.

10. The non-transitory computer-readable storage medium as recited in claim 1, further storing computer-executable instructions that, when executed by the processor, cause the computing device to:
    identify a second object within the image stream from the computing device;
    determine whether the object or the second object is a dominant object within the image stream from the computing device;
    track a position of the dominant object within the image stream;
    detect relative movement of the screen of the computing device and the dominant object within the image stream; and
    move one or more portions of the three-dimensional model of the detected face based on the detected relative movement of the computing device so the one or more portion of the three-dimensional model of the detected face follow the dominant object.

11. The non-transitory computer-readable storage medium as recited in claim 10, wherein the computer-executable instructions, when executed by the processor, cause the computing device to determine whether the object or the second object is the dominant object within the image stream from the computing device based on one or more of:
   determining which of the object or the second object is closer to the computing device; or
   analyzing, in combination with facial recognition techniques utilized on the object and the second object, one or more of contact information associated with the computing device, messaging information associated with the computing device, email information, calendar information associated with the computing device, or social media activity history associated with the computing device.

12. In a digital environment for accessing and displaying digital media, a computer implemented method of animating digital media items in response to movements of viewers of the digital media items comprising:
   detecting, by a computing device, a face within a digital photograph;
   performing a step for building, by the computing device, a three-dimensional model of the detected face;
   displaying the three-dimensional model of the face on a screen of the computing device;
   identifying an object within an image stream from the computing device;
   performing a step for tracking a position of the object within the image stream;
   detecting relative movement of the screen of the computing device and the object within the image stream by extrapolating a degree of movement associated with the computing device in response to detecting a change in coordinates associated with the object; and
   performing a step for moving, by the computing device, one or more portions of the three-dimensional model of the detected face based on the detected relative movement of the computing device and the object within the image stream so the one or more portions of the three-dimensional model of the detected face follow the object.

13. The method as recited in claim 12, further comprising:
   accessing the image stream from a front-facing camera of the computing device; and
   wherein identifying the object within the image stream comprises identifying a face within the image stream from the front-facing camera.

14. The method as recited in claim 13, wherein identifying the face within the image stream from the front-facing camera is based on one or more of facial recognition techniques, facial measurement techniques, or point tracking techniques.

15. The method as recited in claim 14, wherein tracking a position of the object within the image stream comprises:
   identifying a center point of the face within the image stream from the front-facing camera; and
   detecting a change in coordinates associated with the center point of the face within the image stream.

16. The method as recited in claim 15, wherein detecting relative movement of the screen of the computing device and the object within the image stream further comprises, extrapolating a degree of movement associated with the computing device in response to detecting a change in coordinates associated with the center point of the face within the image stream.

17. The method as recited in claim 16, wherein detecting relative movement of the screen of the computing device and the object within the image stream is further based on one or more of accelerometer information provided by the computing device or gyroscopic information provided by the computing device.

18. The method as recited in claim 12, further comprising:
   determining there has been no detected relative movement of the screen of the computing device and the object within the image stream for a threshold amount of time; and
   moving one or more portions of the three-dimensional model of the detected face in a pre-configured manner.

19. A system for animating digital media items in response to movements of viewers of the digital media items comprising:
   at least one display;
   at least one digital camera;
   at least one processor; and
   at least one non-transitory computer-readable storage medium storing instructions thereon that, when executed by the at least one processor, cause the system to:
   detect a first face within a digital photograph;
   build a three-dimensional model of the detected first face;
   display the three-dimensional model of the face on the at least one display;
   identify a second face within an image stream from the at least one camera;
   track a position of the second face within the image stream;
   detect relative movement of the at least one display and the second face within the image stream by extrapolating a degree of movement associated with the at least one display in response to detecting a change in coordinates associated with a center point of the second face; and
   move one or more portions of the three-dimensional model of the detected first face based on the tracked position of the second face so the one or more portions of the three-dimensional model of the detected first face follow the second face.

20. The system as recited in claim 19, wherein the instructions thereon, when executed by the at least one processor, cause the system to move the one or more portions of the three-dimensional model of the detected first face in real time in response to tracked movement of the position of the second face.

* * * * *